US007829820B2

(12) United States Patent
Karogal et al.

(10) Patent No.: US 7,829,820 B2
(45) Date of Patent: Nov. 9, 2010

(54) FLUX CORED ELECTRODE WITH FLUORINE

(75) Inventors: Nikhil U. Karogal, Cleveland, OH (US); Rajeev Katiyar, Mentor, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 1148 days.

(21) Appl. No.: 11/099,293

(22) Filed: Apr. 5, 2005

(65) Prior Publication Data

US 2006/0219685 A1 Oct. 5, 2006

(51) Int. Cl.
*B23K 35/02* (2006.01)

(52) U.S. Cl. .............................. 219/145.22; 219/145.1; 219/146.24

(58) Field of Classification Search ............ 219/145.22, 219/146.23, 146.24, 145.1
See application file for complete search history.

(56) References Cited

U.S. PATENT DOCUMENTS

| | | | | |
|---|---|---|---|---|
| 3,566,073 A | * | 2/1971 | Black .................... | 219/146.52 |
| 3,947,655 A | * | 3/1976 | Gonzalez et al. ....... | 219/146.52 |
| 4,465,921 A | * | 8/1984 | Sakai et al. ............ | 219/146.24 |
| 4,566,916 A | * | 1/1986 | Nagano et al. ........ | 148/26 |
| 4,683,011 A | * | 7/1987 | Weaver et al. .......... | 148/26 |
| 4,723,061 A | | 2/1988 | Munz et al. | |
| 5,003,155 A | | 3/1991 | Chai et al. | |
| 5,055,655 A | | 10/1991 | Chai et al. | |
| 5,120,931 A | | 6/1992 | Kotecki et al. | |
| 5,225,661 A | | 7/1993 | Chai et al. | |
| 5,369,244 A | | 11/1994 | Kulikowski et al. | |
| 6,339,209 B1 | * | 1/2002 | Kotecki ................ | 219/146.23 |
| 6,476,356 B2 | * | 11/2002 | Kim ..................... | 219/145.22 |
| 6,835,913 B2 | * | 12/2004 | Duncan et al. ....... | 219/137 WM |

FOREIGN PATENT DOCUMENTS

| EP | 1 676 669 | 7/2006 |
|---|---|---|
| JP | 2001205483 | 7/2001 |

OTHER PUBLICATIONS

Saito & Hata International Patent Office, Japanese Office Action issued Jun. 12, 2009, but mailed Jul. 21, 2009, 5 pages.
Office Action dated Feb. 12, 2010, in corresponding Canadian patent application No. 2,528,809, 3 pages.

* cited by examiner

*Primary Examiner*—M. Alexandra Elve
(74) *Attorney, Agent, or Firm*—Louis F. Wagner; Hahn Loeser & Parks LLP

(57) ABSTRACT

A cored electrode to form a weld bead with little or no gas tracking. The cored electrode includes a metal sheath and a fill composition. The filling composition includes a slag forming agent and at least one fluorine containing compound.

14 Claims, No Drawings ered productivity and versatility. Such increase in productivity and versatility results from the continuous nature of the welding electrodes in gas metal arc welding (GMAW & GMAW-C) which offers substantial productivity gains over shielded metal arc welding (SMAW). Moreover, these electrodes produce very good looking welds with very little slag, thus saving time and expense associated with cleaning welds and disposing of slag, a problem that is often encountered in the other welding processes.

FLUX CORED ELECTRODE WITH FLUORINE

The invention relates generally to the field of welding and more particularly directed to electrodes having improved weld bead formation properties, and even more particularly directed to cored electrodes that form weld beads having reduced amounts of gas tracking.

BACKGROUND OF THE INVENTION

In the field of arc welding, the main types of welding processes are gas-metal arc welding with solid (GMAW) or metal-cored wires (GMAW-C), gas shielded flux-cored arc welding (FCAW-G), self shielded flux-cored arc welding (FCAW-S), shielded metal arc welding (SMAW) and submerged arc welding (SAW). Of these processes, gas metal arc welding with solid or metal-cored electrodes are increasingly being used for joining or overlaying metallic components. These types of welding processes are becoming increasingly popular because such processes provide increased productivity and versatility. Such increase in productivity and versatility results from the continuous nature of the welding electrodes in gas metal arc welding (GMAW & GMAW-C) which offers substantial productivity gains over shielded metal arc welding (SMAW). Moreover, these electrodes produce very good looking welds with very little slag, thus saving time and expense associated with cleaning welds and disposing of slag, a problem that is often encountered in the other welding processes.

In gas metal arc welding with solid or cored electrodes, a shielding gas is used to provide protection for the weld against atmospheric contamination during welding. Solid electrodes are appropriately alloyed with ingredients that, in combination with the shielding gas, provide porosity free welds with the desired physical and mechanical properties. In cored electrodes, these ingredients are on the inside, in the core (fill) of a metallic outer sheath, and provide a similar function as in the case of solid electrodes.

Solid and cored electrodes are designed to provide, under appropriate gas shielding, a solid, substantially porosity free weld with yield strength, tensile strength, ductility and impact strength to perform satisfactorily in the final applications. These electrodes are also designed to minimize the quantity of slag generated during welding. Cored electrodes are used increasingly as an alternative to solid wires because of increased productivity during welding fabrication of structural components. Cored electrodes are composite electrodes consisting of a core (fill) material surrounded by a metallic outer sheath. The core consists mainly of metal powder and fluxing ingredients to help with arc stability, weld wetting and appearance etc., such that the desired physical and mechanical properties are obtained in the weld. Cored electrodes are manufactured by mixing up the ingredients of the core material and depositing them inside a formed strip, and then closing and drawing the strip to the final diameter. Cored electrodes provide increased deposition rates and produce a wider, more consistent weld penetration profile compared to solid electrodes. Moreover, they provide improved arc action, generate less fume and spatter, and provide weld deposits with better wetting compared to solid electrodes.

In the art of welding, much prior effort has been expended in developing flux compositions of the type having predetermined flux components intended to perform in predetermined manners. A large number of compositions have been developed for use as fluxes in arc welding. Fluxes are utilized in arc welding to control the arc stability, modify the weld metal composition, and provide protection from atmospheric contamination. Arc stability is commonly controlled by modifying the composition of the flux. It is therefore desirable to have substances which function well as plasma charge carriers in the flux mixture. Fluxes also modify the weld metal composition by rendering impurities in the metal more easily fusible and providing substances with which these impurities may combine, in preference to the metal to form slag. Other materials may be added to lower the slag melting point, to improve slag fluidity, and to serve as binders for the flux particles.

Cored electrodes are commonly used in electric arc welding of steel base metals. These electrodes generally yield high strength welds in a single pass and multiple passes at high welding speeds. These electrodes are formulated to provide a solid, substantially nonporous weld bead with tensile strength, ductility and impact strength to meet the desired end use of various applications. One such welding electrode is disclosed in U.S. Ser. No. 11/028,344 filed Jan. 3, 2005 entitled "Cored Electrode to Reduce Diffusable Hydrogen", which is incorporated herein by reference.

One of the many challenges during the formation of a weld metal is to form a high quality weld bead. One phenomenon during the formation of a weld bead is gas tracking. Gas tracking is a phenomenon observed during gas shielded FCAW wherein craters resembling worms are observed on the surface of the weld bead. This phenomenon is mostly observed in fast freezing slag systems (rutile based) where the slag solidifies much faster than the weld pool. Due to the rapid solidification of the slag, the gas evolving from the molten weld is partially trapped and thus forms craters on the weld bead surface.

In view of the present state of the art of the fill compositions used in conjunction with cored welding electrodes, there is a need for a welding electrode that forms a high quality weld bead with reduced amounts of surface craters formed from gas tracking.

SUMMARY OF THE INVENTION

The present invention pertains to welding electrodes, and more particularly, to a welding electrode that includes a fill composition which forms high quality weld bead with reduced amounts of surface craters formed from gas tracking. The welding electrode of the present invention can also be formulated to reduce the amount of diffusible hydrogen in the weld bead; however, this is not required. The fill composition of the present invention is particularly directed to cored electrodes having a metal sheath that surrounds the fill composition in the core of the sheath; however, the fill composition can be applied to other types of electrodes (e.g., coating on a stick electrodes, etc.), or be used as part of a flux composition in a submerged arc welding process. The fill composition of the present invention is particularly formulated for use with electrodes used to weld mild and low alloy steel; however, the fill composition can be used with electrodes for the formation of welding beads on other types of metals. The metal electrode is typically formed primarily from iron (e.g., carbon steel, low carbon steel, stainless steel, low alloy steel, etc.); however, the base metal can be primarily formed of other materials. The fill composition typically constitutes at least about 1 weight percent of the total electrode weight, and not more than about 80 weight percent of the total electrode weight, and typically about 8-60 weight percent of the total electrode weight, and more typically about 10-50 weight percent of the total electrode weight, even more typically about 11-40 weight percent of the total electrode weight, and still even more about 12-30 weight percent of the total electrode weight; however, other weight percentages can be used. The fill composition includes one or more slag forming agents and one or more fluorine containing compounds. These components of the fill composition are used to form a unique slag system about the molten weld metal so as to reduce gas tracking of the weld metal. These components can also be used to facilitate in the formation of the weld bead, to reduce the amount of hydrogen in the weld bead, and/or to at least partially shield the formed weld bead from the atmosphere. A majority weight percent of the one or more slag forming agents includes titanium oxide (e.g., rutile, etc.) and/or titanium oxide containing compound (e.g., potassium silico-titanate, sodium silico-titanate, etc.). The fill composition can include additional slag forming agents. The weight percent of the one or more slag forming agents in the fill composition is generally less than about 80 weight percent, typically about 20-75 weight percent, and more typically about 35-60 weight percent; however, other amounts can be used. Generally, the weight percent of the slag forming agents is greater than the weight percent of the fluorine containing compound. Generally, the weight percent ratio of the slag forming agent to the fluorine containing compound is about 1.1-20:1, typically about 2-15:1, and more typically about 5-12:1; however, other ratios can be used. One or more fluorine containing compounds are used to modify the properties of the slag so as to reduce the tendency of gas tracking on the formed weld bead. The fluorine containing compound can be used to reduce the melting point of slag. The lower melting point of the slag allows the slag to remain molten for a longer time thereby allowing more time for gases to evolve from the molten weld and to dissolve in the slag. The inclusion of fluorine in the slag can also promote the formation of HF. One of the gases evolving from the weld is hydrogen. Fluorine in the slag can react with the evolving hydrogen gas and form HF. The formation of HF decreases the partial pressure of hydrogen in the weld system thereby reducing the incidence of gas tracking. The fluorine in the slag can also reduce the amount of hydrogen in the formed weld bead. This reduction of hydrogen is believed to be accomplished in one or more ways. It is believed that during the welding process, some of the fluorine compound decomposes and releases fluorine gas into the atmosphere. The released fluorine gas has a shielding effect which shields the molten weld bead from surrounding moisture and/or other hydrogen sources. In addition, some of the fluorine can react with the hydrogen and forms HF which is insoluble in the molten weld metal. It is also believed that some of the low melting fluorine containing compound facilitates in covering and/or coating the weld bead to form a barrier against the surrounding hydrogen. As such, the amount of hydrogen that is able to diffuse into the weld bead is diminished. It is further believed that during the welding process, some of the fluorine compound decomposes and enters into the slag that covers the molten weld metal. The fluorine in the slag is believed to modify the slag lattice to enable increased transfer of hydrogen from the molten weld metal. This transfer of hydrogen from the molten metal both decreases the amount of hydrogen in the weld bead and also reduces the incidence of gas tracking. Non-limiting examples of fluorine containing compounds that can be included in the fill composition include aluminum fluoride, barium fluoride, bismuth fluoride, calcium fluoride, manganese fluoride, potassium fluoride, sodium fluoride, strontium fluoride, Teflon, $Na_2SiF_6$, $K_2SiF_6$, $Na_3AlF_6$ and/or $K_3AlF_6$; however, it can be appreciated that other or additional fluorine containing compounds can be used. The total fluorine content of the fill composition is at least about 0.5 weight percent. Typically, the total fluorine content of the fill composition is less than about 15 weight percent, more typically about 1-10%; however, it can be appreciated that other fluorine amounts can be used. In one non limiting embodiment of the invention, the one or more fluorine containing compounds contribute at least about 0.1 weight percent fluorine to the fill composition, and typically less than about 10 weight percent; however, other amounts can be included in the fill.

In another and/or alternative aspect of the present invention, the composition of the metal sheath of the welding electrode is selected to at least closely match the desired weld metal composition. Typically the metal sheath includes a majority of iron when welding a ferrous based workpiece (e.g., carbon steel, stainless steel, etc.); however, the composition of the sheath can include various types of metals to achieve a particular weld bead composition. In one embodiment of the invention, the metal sheath primarily includes iron and can include one or more other elements such as, but not limited to, aluminum, antimony, bismuth, boron, carbon, cobalt, copper, lead, manganese, molybdenum, nickel, niobium, silicon, sulfur, tin, titanium, tungsten, vanadium, zinc and/or zirconium. In still another and/or alternative embodiment of the invention, the iron content of the metal sheath is at least about 80 weight percent.

In still another and/or alternative aspect of the present invention, the fill composition can include one or more weld metal protection agents and/or modifying agents. The components of the fill can include metal alloying agents (e.g., aluminum, boron, calcium, carbon, chromium, iron, manganese, nickel, silicon, titanium, zirconium, etc.) that are at least partially used to provide protection to the weld metal during and/or after a welding procedure, to facilitate in a particular welding procedure, and/or to modify the composition of the weld bead. In one embodiment of the invention, the fill composition includes at least one of the weld metal protection agents. In another and/or alternative embodiment of the invention, the fill composition includes one or more alloying agents used to facilitate in forming a weld metal with the desired composition. In still another and/or alternative embodiment of the invention, the fill composition includes one or more slag modifiers. The slag modifiers are typically used to increase and/or decrease the viscosity of the slag, to improve the ease of slag removal from the weld metal, reduce fume production, reduce spattering, etc.

In yet another and/or alternative aspect of the present invention, a shielding gas can be used in conjunction with the welding electrode to provide protection to the weld bead from elements and/or compounds in the atmosphere. The shielding gas generally includes one or more gases. These one or more gases are generally inert or substantially inert with respect to the composition of the weld bead. In one embodiment, argon, carbon dioxide or mixtures thereof are at least partially used as a shielding gas. In one aspect of this embodiment, the shielding gas includes about 2-40 percent by volume carbon dioxide and the balance of argon. In another and/or alternative aspect of this embodiment, the shielding gas includes about 5-25 percent by volume carbon dioxide and the balance of argon. As can be appreciated, other and/or additional inert or substantially inert gases can be used.

In still yet another and/or alternative aspect of the present invention, the electrode of the present invention includes a fill composition that includes one or more slag forming agents that do not include titanium oxide. These slag forming agents can include one or more metal oxides (e.g., aluminum oxide, boron oxide, calcium oxide, chromium oxide, iron oxide, magnesium oxide, niobium oxide, potassium oxide, silicon dioxide, sodium oxide, tin oxide, vanadium oxide, zirconium oxide, etc.) and/or one or more metal carbonates (e.g., calcium carbonate, etc.). The slag system of the fill composition is used to at least partially provide protection to the weld metal or buffer layer during and/or after a deposition procedure and/or to facilitate in a particular deposition procedure. In still yet another non-limiting embodiment of the invention, the slag system can include at least one slag wetting agent, arc stabilization agent, slag removal agent, and/or a surface deposition agent. The slag wetting agent, when used, facilitates in ensuring that the slag fully covers the deposited metal to protect the deposited metal from the atmosphere until the metal deposited layers has at least partially solidified and/or to facilitate in the appearance of the deposited metal. The stabilization agent, when used, facilitates in producing a quiet arc that minimizes spatter. The surface deposition agent, when used, contributes to the shine and overall surface appearance of the deposited metal. The slag removal agent, when used, contributes to the easy removal of the slag on and/or around the deposited metal. The slag system can also include agents that increase and/or decrease the viscosity of the slag, and/or reduce fume production.

In a further and/or alternative aspect of the present invention, the electrode of the present invention includes a fill composition that can include one or more deoxidizers used to reduce the adverse effects of oxygen about the weld metal. Non-limiting examples of one or more deoxidizers that can be included in the fill composition includes aluminum, magnesium, manganese, silicon and/or titanium. Generally, the deoxidizer, when included in the fill composition, constitutes less than about 40 weight percent of the fill composition, and typically about 1-30 weight percent; however, other weight percent can be used.

In still a further and/or alternative aspect of the present invention, the electrode of the present invention includes a fill composition can include one or more metal alloying agents selected to at least closely match the desired weld metal composition and/or to obtain the desired properties of the formed weld bead. Non-limiting examples of such alloying metals include aluminum, antimony, bismuth, boron, calcium, carbon, chromium, cobalt, copper, iron, lead, manganese, molybdenum, nickel, niobium, silicon, sulfur, tin, titanium, tungsten, vanadium, zinc and/or zirconium; however, other or additional metal alloying agents can be used. In one embodiment, the metal alloying agent includes at least two metals selected from boron, iron, manganese, silicon and titanium. Generally, the metal alloying agent, when included in the fill composition, constitutes less than about 80 weight percent of the fill composition, and typically about 10-60 weight percent; however, other weight percent can be used.

It is a primary object of the invention to provide a welding electrode that reduces the gas tracking in a formed weld bead.

Another and/or alternative object of the present invention is the provision of a welding electrode that reduces the amount of diffusible hydrogen in the weld bead.

Still another and/or alternative object of the present invention is the provision of a welding electrode that includes a combination of one or more titanium compounds and fluorine containing compounds to reduce the gas tracking and/or amount of diffusible hydrogen in the formed weld bead Yet another and/or alternative object of the present invention is the provision of a welding electrode that is a cored electrode.

Still yet another and/or alternative object of the present invention is the provision of a welding electrode that is a gas shielded cored electrode.

These and other objects and advantages will become apparent from the discussion of the invention.

DETAILED DESCRIPTION OF THE INVENTION

The cored electrode of the present invention overcomes the past problems associated with gas tracking. The fill composition of the flux coded electrode includes titanium oxide as the principal slag forming agent and one or more fluorine containing compounds that are used to at least partially modify the properties of the slag formed during welding so as to reduce or eliminate the existence of gas tracking on the weld metal. Many types of fluorine containing compounds can be used in the fill composition.

A general formulation of the fill composition (weight percent) in accordance with the present invention is set forth as follows:

| | |
|---|---|
| Non-fluorine containing slag forming agent | 15-80% |
| Fluorine containing compound | 0.5-20% |
| Metal deoxidizer | 0-40% |
| Metal alloying agent | 0-70% |

In another more specific general formulation of the fill composition (weight percent):

| | |
|---|---|
| Non-fluorine containing slag forming agent | 25-75% |
| Fluorine containing compound | 1-15% |
| Metal deoxidizer | 0-35% |
| Metal alloying agent | 0-50% |

In the above general formulas, the fluorine content generated by one or more fluorine containing compounds is at least about 0.05 weight percent of the fill composition, typically at least about 0.1 weight percent, more typically at least about 0.2 weight percent. In the above general formulas, the weight percent of the fill composition is typically about 8-60 weight percent of the cored electrode, and more typically about 10-28 weight percent of the cored electrode; however, other weight percentages can be used. The metal sheath that can be used to form the weld bead can include about 0-0.2 weight percent B, about 0-0.2 weight percent C, about 0-12 weight percent Cr, about 0-5 weight percent Mn, about 0-2 weight percent Mo, less than about 0.01% N, about 0-5 weight percent Ni, less than about 0.014% P, about 0-4 weight percent Si, less than about 0.02% S, about 0-0.4 weight percent Ti, about 0-0.4 weight percent V and about 75-99.9 weight percent Fe. During an arc welding process, a shielding gas is typically used with the cored electrode; however, this is not required. When a shielding gas is used, the shielding is typically a carbon dioxide and/or argon blend; however other or additional gasses can be used such as, but not limited to, helium.

One specific non-limiting example of a fill composition (weight percent) is as follows:

| | |
|---|---|
| Metal oxide containing slag forming agent | 25-70% |
| Fluorine containing compound | 0.5-15% |
| Metal deoxidizer | 0.5-40% |
| Metal alloying agent (including iron powder) | 0.5-40% |

In another specific non-limiting example of a fill composition (weight percent) is as follows:

| | |
|---|---|
| TiO$_2$ | 30-65% |
| Other slag forming agents | 0-15% |
| Fluorine containing compound | 1-12% |
| Iron power | 0-12% |
| Cast iron powder | 0-8% |
| Metal alloying agent (excluding iron powder) | 0-18% |
| Metal deoxidizer | 0-20% |

In still another specific non-limiting example of a fill composition (weight percent) is as follows:

| | |
|---|---|
| Rutile | 10-35% |
| Other TiO$_2$ compound | 15-45% |
| Al$_2$O$_3$ | 0-10% |
| Silica and/or silica compound | 0-10% |
| Fluorine containing compound | 1.5-8% |
| FeB | 0-1% |
| FeMn | 0-15% |
| FeSi | 0-15 |
| FeTi | 0-15 |
| Mg | 0-6% |
| Cast iron powder | 0-5% |
| Fe powder | 0-15% |

In yet another specific non-limiting example of a fill composition (weight percent) is as follows:

| | |
|---|---|
| Rutile | 12-30% |
| Potassium and/or sodium silico-titanate | 24-35% |
| Al$_2$O$_3$ | 2-8% |
| Silica and/or silica compound | 1-8% |
| K$_2$SiF$_6$, Na$_2$SiF$_6$, Na$_3$AlF$_6$, K$_3$AlF$_6$, NaF, KF and/or MnF | 1.5-6% |
| FeB | 0.05-1% |
| FeMn | 1-10% |
| FeSi | 1-10 |
| FeTi | 1-10 |
| Mg | 1-5% |
| Cast iron powder | 0-4% |
| Fe powder | 2-10% |

In still yet another specific non-limiting example of a fill composition (weight percent) is as follows:

| | |
|---|---|
| Rutile | 14-30% |
| Potassium and/or sodium silico-titanate | 25-32% |
| Al$_2$O$_3$ | 4-8% |
| Silica and/or silica compound | 2-8% |
| K$_2$SiF$_6$, Na$_2$SiF$_6$, Na$_3$AlF$_6$ and/or K$_3$AlF$_6$ | 1.5-6% |
| FeB | 0.05-0.6% |
| FeMn | 5-10% |
| FeSi | 5-10 |
| FeTi | 2-8 |
| Mg | 1-4% |
| Cast iron powder | 0-4% |
| Fe powder | 4-10% |

In the five specific examples set forth above, the weight percent of the fill composition is about 13-30 weight percent of the cored electrode, and the metal sheath includes about 0-0.2 weight percent B, about 0-0.2 weight percent C, about 0-12 weight percent Cr, about 0-5 weight percent Mn, about 0-2 weight percent Mo, less than about 0.01% N, about 0-5 weight percent Ni, less than about 0.014% P, about 0-4 weight percent Si, less than about 0.02% S, about 0-0.4 weight percent Ti, about 0-0.4 weight percent V and about 75-99.9 weight percent Fe. During an arc welding process, a shielding gas is used with the cored electrode. The shielding gas is typically a blend of carbon dioxide and argon. The boron content is about 15-30 weight percent of the FeB. The manganese content is about 30-50 weight percent of the FeMn. The silicon content is about 30-50 weight percent of the FeSi. The titanium content is about 30-50 weight percent of the FeTi. The carbon content is about 2-6 weight percent of the cast iron powder. The average particle size of the fill components is about 40-200 mesh, and typically about 40-100 mesh.

In the examples set forth above, rutile, sodium silico-titanate, potassium silico-titanate, Al$_2$O$_3$, silica and silica compound are slag forming agents. Sodium silico-titanate and potassium silico-titanate is also a slag modifying agent and an arc stabilizing agent. As can be appreciated, other or additional slag forming, slag modifying and/or arc stabilizing agents can be used in the fill composition. K$_2$SiF$_6$, Na$_2$SiF$_6$, K$_3$AlF$_6$, Na$_3$AlF$_6$, KF, MnF, and NaF are the fluorine generating compounds. The one or more fluorine generating compounds in the fill composition are present in an amount supply at least about 0.2 weight percent fluorine to the fill composition. KF, NaF, MnF, K$_2$SiF$_6$ and Na$_2$AlF$_6$ are also slag modifying agents. KF, NaF, K$_2$SiF$_6$, Na$_2$SiF$_6$, K$_3$AlF$_6$, and Na$_3$AlF$_6$ are also arc stabilizing agents. As can be appreciated, other or additional fluorine generating compounds can be used in the fill composition. FeMn, FeSi, FeTi, and Mg are alloying agents and/or deoxidizing agents. These components are added to the fill composition to achieve the desired metal alloy composition of the weld metal and to reduce the oxygen in and about the weld metal during the welding process. As can be appreciated, other or additional alloying agents and/or deoxidizers can be used in the fill composition. Mg is primarily added as a deoxidizer. FeB is primarily as a micro-alloying agent. As can be appreciated, other or additional micro-alloying agents can be used in the fill composition. Cast Iron Powder and Fe powder are also added to achieve the desired metal alloy composition of the weld metal.

These and other modifications of the discussed embodiments, as well as other embodiments of the invention, will be obvious and suggested to those skilled in the art from the disclosure herein, whereby it is to be distinctly understood that the foregoing descriptive matter is to be interpreted merely as illustrative of the present invention and not as a limitation thereof.

We claim:

1. A process for forming a weld bead with reduced gas tracking using a cored electrode comprising a metal sheath and a fill composition, comprising the steps of:
   (a) providing a cored electrode for use in gas shielded flux-cored arc welding which comprises a sheath and a fill composition:
   (i) said sheath comprising iron;
   (ii) said fill composition comprising:
      (A) about 15-80 wt. % slag forming agent based on said fill composition, said slag forming agent further comprising:
         (I) a titanium dioxide;
         (II) at least one potassium silico-titanate compound and sodium silico-titanate;
         (III) a metal oxide selected from the group consisting of aluminum oxide, boron oxide, calcium oxide, chromium oxide, iron oxide, magnesium oxide, niobium oxide, potassium oxide, silicon dioxide, sodium oxide, tin oxide, vanadium oxide, zirconium oxide and mixtures thereof;

(IV) over 50 weight percent of said slag forming agent comprising titanium dioxide and said at least one silico-titanate compound;
(V) said slag forming composition comprising:
10-35% titanium dioxide;
15-45% silico-titanate compound;
0-10% $Al_2O_3$; and
0-10% silica or silica compound;
(B) about 0.5-20 wt. % of at least one fluorine containing compound based on said fill composition;
(C) a wt. % ratio of said metal oxide to said fluorine containing compound ranging from about 1.1/1-20/1; and
(b) at least partially melting said cored electrode by an electric current to cause said melted portion of said cored electrode to be deposited on said workpiece;
(i) said combination of said titanium dioxide, said at least one silico-titanate compound and said metal oxide in said slag forming agent lowering a melting point of a slag formed with the addition of said at least one silico-titanate compound, to allow said slag to remain molten for a longer period of time for gases to evolve from said molten weld and dissolve in said slag; and
(ii) said fluorine containing compound promoting a formation of hydrogen fluoride which decreases a partial pressure of hydrogen in said weld bead thereby further reducing said gas tracking, said fluorine containing compound releasing at least some fluorine gas to shield said molten weld bead from surrounding moisture and other hydrogen sources.

2. The process of claim 1 which further comprises the step of:
directing a shielding gas to said workpiece.

3. The process of claim 2 wherein
said shielding gas is selected from the group consisting of argon, carbon dioxide, and mixtures thereof.

4. The process of claim 1 wherein
said fluorine containing compound is selected from the group consisting of $AlF_3$, $BaF_2$, $CaF_2$, $Na_3AlF_6$, $K_3AlF_6$, $Na_2SiF_6$, $K_2SiF_6$, $MnF_3$, $SrF_2$ and mixtures thereof.

5. The process of claim 1 wherein
said sheath includes at least about 80 wt. % iron.

6. The process of claim 1 wherein
said titanium dioxide has a rutile structure.

7. The process of claim 1 wherein
said wt. % ratio of said metal oxide to said fluorine containing compound ranging from about 2/1-15/1.

8. The process of claim 7 wherein
said wt. % ratio of said metal oxide to said fluorine containing compound ranging from about 5/1-12/1.

9. A flux composition for a cored electrode comprising a metal sheath and a fill composition, comprising:
(a) said sheath comprising iron;
(b) said fill composition comprising:
(i) about 15-80 wt. % slag forming agent, said slag forming agent further comprising:
(A) a titanium dioxide;
(B) at least one potassium silico-titanate compound and sodium silico-titanate compound;
(C) a metal oxide selected from the group consisting of aluminum oxide, boron oxide, calcium oxide, chromium oxide, iron oxide, magnesium oxide, niobium oxide, potassium oxide, silicon dioxide, sodium oxide, tin oxide, vanadium oxide, zirconium oxide and mixtures thereof;
(D) over 50 weight percent of said slag forming agent comprising titanium dioxide and said at least one silico-titanate compound;
(E) said slag forming composition comprising:
10-35% titanium dioxide;
15-45% silico-titanate compound;
0-10% $Al_2O_3$; and
0-10% silica or silica compound;
(ii) about 0.5-20 wt. % of at least one fluorine containing compound;
(iii) a wt. % ratio of said metal oxide to said fluorine containing compound ranging from about 1.1/1-20/1; and
(c) said combination of said titanium dioxide, said at least one silico-titanate compound and said metal oxide in said slag forming agent lowering a melting point of a slag formed with the addition of said at least one silico-titanate compound, to allow said slag to remain molten for a longer period of time for gases to evolve from said molten weld and dissolve in said slag; and
(d) said fluorine containing compound promoting a formation of hydrogen fluoride which decreases a partial pressure of hydrogen in said weld bead thereby further reducing said gas tracking, said fluorine containing compound releasing at least some fluorine gas to shield said molten weld bead from surrounding moisture and other hydrogen sources.

10. The composition of claim 9 wherein
said fluorine containing compound is selected from the group consisting of $AlF_3$, $BaF_2$, $CaF_2$, $Na_3AlF_6$, $K_3AlF_6$, $Na_2SiF_6$, $K_2SiF_6$, $MnF_3$, $SrF_2$ and mixtures thereof.

11. The composition of claim 9 wherein
said sheath includes at least about 80 wt. % iron.

12. The composition of claim 9 wherein
said titanium dioxide has a rutile structure.

13. The composition of claim 9 wherein
said wt. % ratio of said metal oxide to said fluorine containing compound ranging from about 2/1-15/1.

14. The composition of claim 13 wherein
said wt. % ratio of said metal oxide to said fluorine containing compound ranging from about 5/1-12/1.

* * * * *